United States Patent

Bassett et al.

[11] 4,373,662
[45] Feb. 15, 1983

[54] INTEGRATED CONTROL SYSTEM USING A MICROPROCESSOR

[75] Inventors: William W. Bassett, Wayzata; Dean R. Rask, Minneapolis, both of Minn.

[73] Assignee: Honeywell Inc., Minneapolis, Minn.

[21] Appl. No.: 197,841

[22] Filed: Oct. 17, 1980

[51] Int. Cl.³ .............. F24D 5/10; G05D 23/00
[52] U.S. Cl. .................. 236/10; 165/11 R; 236/94
[58] Field of Search .......... 236/10, 1 EA, 1 EB, 236/21 B, 94; 165/11; 62/126, 129

[56] References Cited
U.S. PATENT DOCUMENTS
2,470,996   5/1949   McGrath .................. 361/1 EB Primary Examiner—William E. Wayner
Attorney, Agent, or Firm—Clyde C. Blinn

[57] ABSTRACT

An integrated control system for a temperature conditioning apparatus which contains a microprocessor which is connected to the various components of a control system of the temperature conditioning apparatus such as the space thermostat, the fuel valve, the fuel igniter and ignition proving apparatus, the plenum temperature sensor, the induced draft blower motor, refrigeration compressor and coil temperature sensor, and the air circulating fan. With the microprocessor, which has the capability of fast and many types of operations, the interaction of parameters of the temperature conditioning apparatus and operation of the various components of the system can be controlled in an improved manner to add to the overall efficiency of such a temperature conditioning apparatus.

1 Claim, 6 Drawing Figures

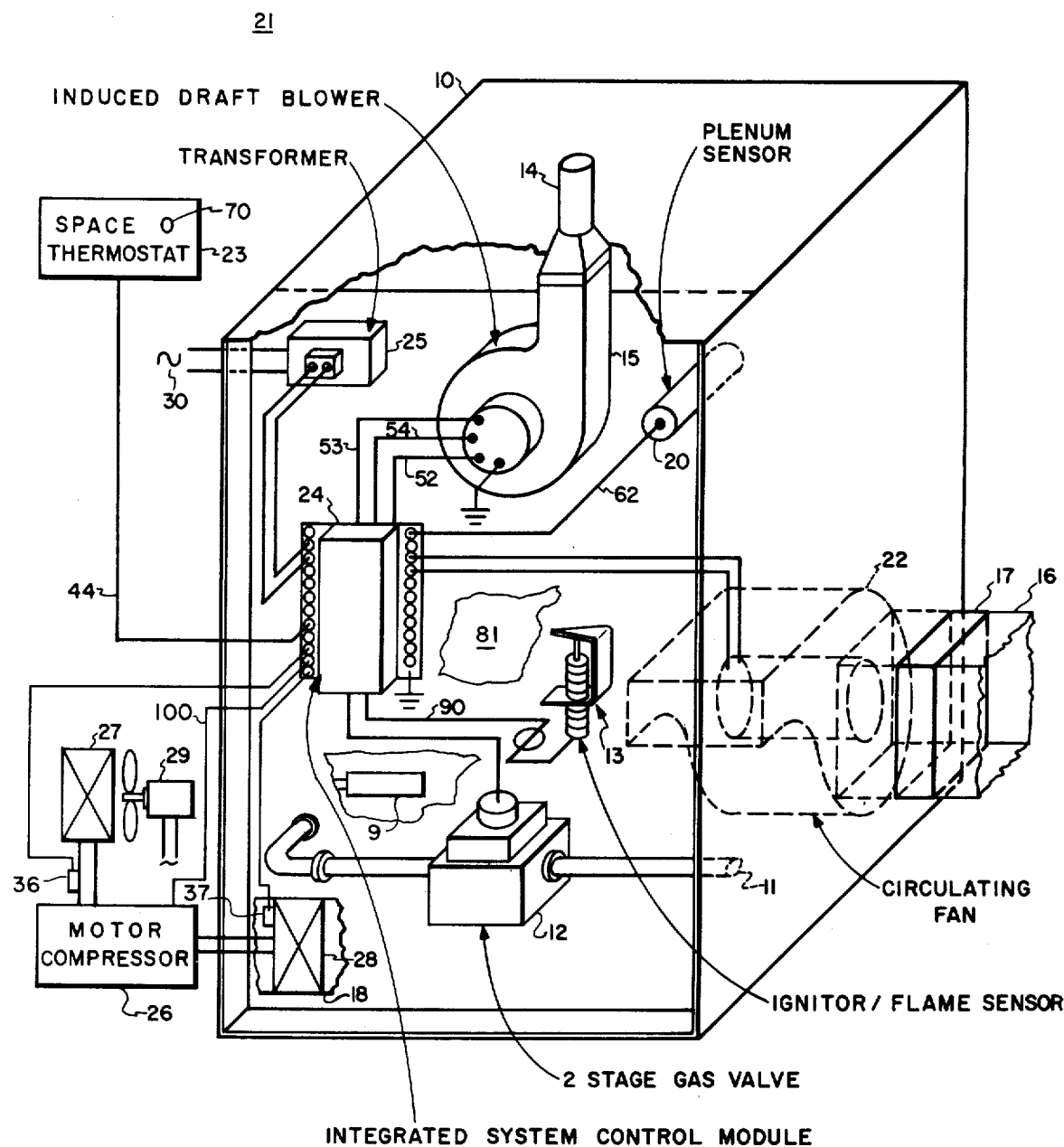

INTEGRATED CONTROL SYSTEM USING A MICROPROCESSOR

BACKGROUND OF THE INVENTION

Even though prior art heating and cooling apparatuses had fuel valve controls, plenum air temperature sensors, air circulating fans, induced draft blowers for the exhaust gases of a furnace, ignition and flame sensor apparatus for proving that the ignition of the fuel in the burner takes place, and many other parameter sensors, all of which were a part of a control system for a furnace or air conditioning compressor supplying heated or cooled air to a space in which a thermostat was contained, there has been a continual need for improvement in such control systems. With the advent of increased energy costs, an even greater demand has been shown for more efficient heating and cooling apparatuses and systems, especially for homes and dwellings wherein an individual furnace and air conditioning supplies the heated or cooled air to the home as required by a space thermostat.

Coincidental with the increased cost of energy, the advent of low cost microprocessors has made it possible for the gathering of parameter data and the control of various components of a control system in many new manners which provide the long-awaited increased efficiency and thus cost saving in the operation of a furnace and air conditioning apparatus.

SUMMARY OF THE PRESENT INVENTION

The present invention is concerned with a temperature control system for a temperature conditioning apparatus delivering air to a space. A plenum temperature responsive means is used to respond to the operating temperature of the air delivered to the space and upon change in the plenum temperature from the normal operation, various abnormal conditions in the operation of the temperature conditioning apparatus are detected.

Specifically, in the temperature conditioning apparatus, an increase in the plenum temperature can come about by a restricted air duct to slow the air flow down through the plenum of the temperature conditioning apparatus. Such reduction in the air flow can also be brought about by a loss of power or any condition to reduce the speed of the air blower and/or a clogged filter.

BRIEF DESCRIPTION OF THE DRAWINGS

The invention is shown in the enclosed drawings of which:

FIG. 1 is a schematic showing of a conventional forced air heating and cooling system.

FIG. 3 is to show the composite of FIGS. 2A to 2D.

DESCRIPTION OF THE PREFERRED EMBODIMENT OF THE INVENTION

Figure 2A:
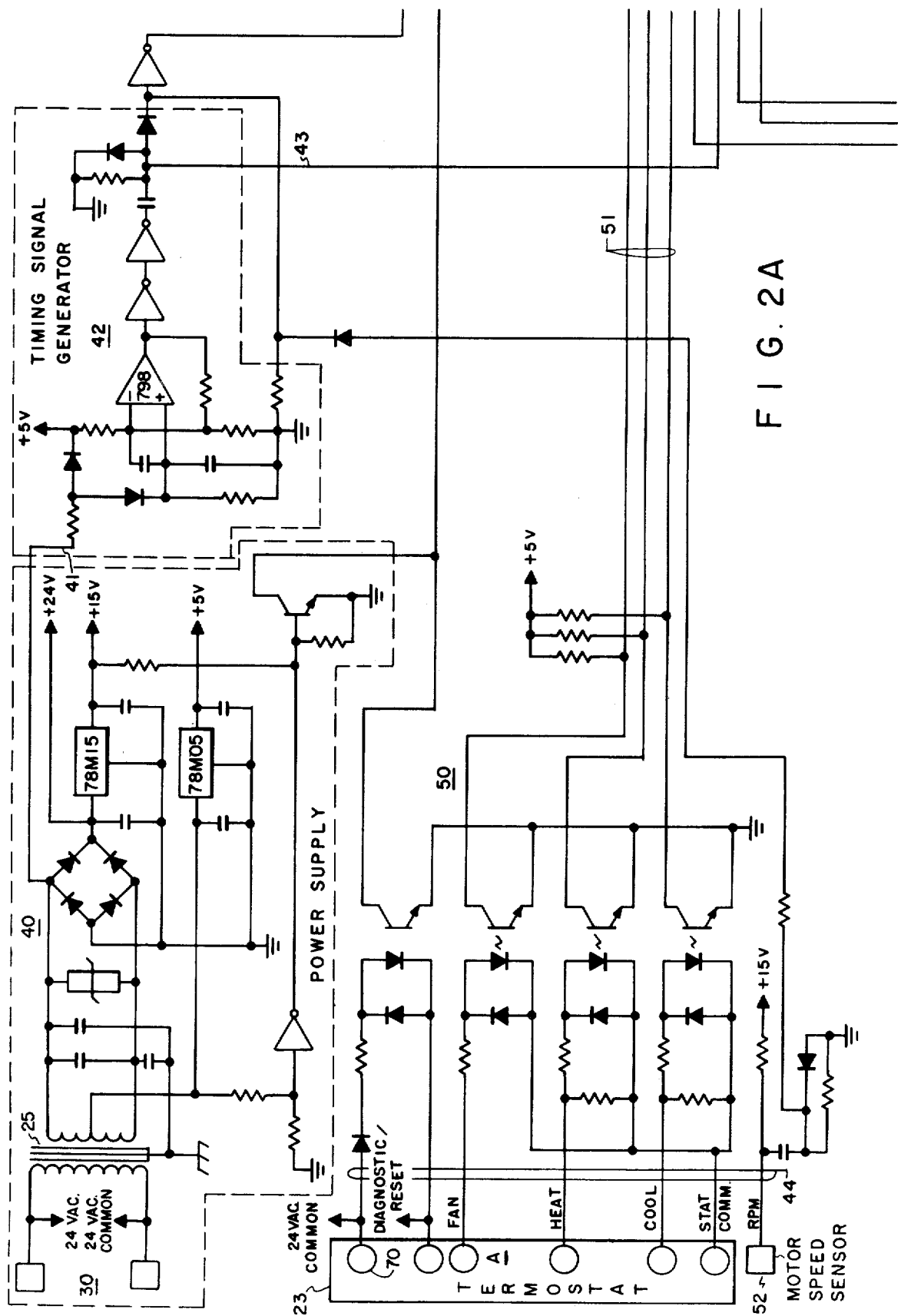
FIGS. 2A to 2D (four) disclose the circuit diagram of a control module connecting the various components of the system to a microprocessor to provide the integrated control system.

Referring to FIG. 1, a temperature conditioning apparatus or furnace 10 is shown. The furnace burner 9 receives fuel from a gas source connected to pipe 11 and is controlled by a gas valve 12. Gas valve 12 may be of several types such as the VR854 for two stage direct spark control and the VR852 for two stage intermittent pilot control, both made and sold by Honeywell Inc. and shown in brochure 60-2447-2 of May 1980. The gas is ignited and a flame is sensed by a conventional igniter and flame sensor 13 such as the Q354 made and sold by Honeywell Inc. and shown in brochure 60-2053-8 of July 1980. The exhaust gases from the furnace are forced out of a stack 14 by a blower 15 to provide an induced draft blower (IDB) furnace. Blower 15 is driven by a conventional shaded pole 120 volt A.C. motor having a Hall effect sensor mounted on the motor shaft to provide a pulse each revolution for a speed sensor and control circuit. The temperature in the bonnet or plenum or the furnace output is sensed by a temperature responsive element 20 such as a C800 Platinum resinate sensor made and sold by Honeywell Inc. and shown in brochure 60-2484-1, Nov. 1979. Temperature conditioned medium or air is circulated through the plenum from a return duct 16 through a filter 17 to the space 21 through a supply duct 18 in a conventional manner by a circulator for a hydronic system or blower 22. The temperature responsive element or thermostat 23 such as a T87F thermostat made by Honeywell Inc. is located in the space connected to controls for the furnace. Thermostat 23 has an indicator light 70 to indicate certain system operating conditions to be mentioned. A conventional refrigeration compressor or heat pump 26 has an outdoor heat exchanger or coil 27 and an indoor heat exchanger or coil 28 which is mounted in supply duct 18. A fan driven by motor 29 removes heat from coil 27. Coil 28 is in the furnace plenum to deliver cool air during the air conditioning operation. Coils 27 and 28 have temperature sensors 36 and 37, respectively, of the C800 type. An integrated system control module 24 which is supplied with power from a transformer 25 connected to a source of power 30, has all of the mentioned apparatus connected thereto for controlling the furnace and compressor.

Referring to FIG. 2, which is made up of a composite of FIGS. 2A to 2D, the schematic circuit of the integrated system control module 24 is shown in more detail. In FIG. 2A, transformer 25, which is connected to the power source 30, supplies power to a conventional power supply 40 which has one output 41 connected to a timing signal generator 42, which provides a 60 Hz signal available over conductor 43. A thermostat 23 is connected over the six wire conductor 44 to the module 24.

The module 24 has a microprocessor 45 of a conventional type known as the 8049 microprocessor which is made and sold by several different companies such as Intel, National Semi Conductor, and Nippon Electric Company. The microprocessor which is shown in FIGS. 2C and 2D is programmed as shown in Appendix II. The microprocessor receives the signal from the timing signal generator 42 over conductor 43 at pin P14. Similarly, the output of the thermostat 23 is connected through switching circuit 50 over the input conductors 51 to the microprocessor at pin P10, P11 and P12. Indication light 70 is connected to a diagnostic output of the microprocessor at 4.

The induced draft blower 15 has two connections to the control module 24. A first connection 52 is from the motor speed sensor in the blower which comprises a conventional Hall effect transducer for providing a pulse on each revolution of the motor shaft and thus providing a revolution per minute signal or input 52. Two other connections 53 and 54 which are shown in FIG. 2G connect motor speed control 55 of the control module to the induced draft blower motor. The motor speed control receives a signal over the conductor 60 from pin P26 of microprocessor 45.

Figure 2B:
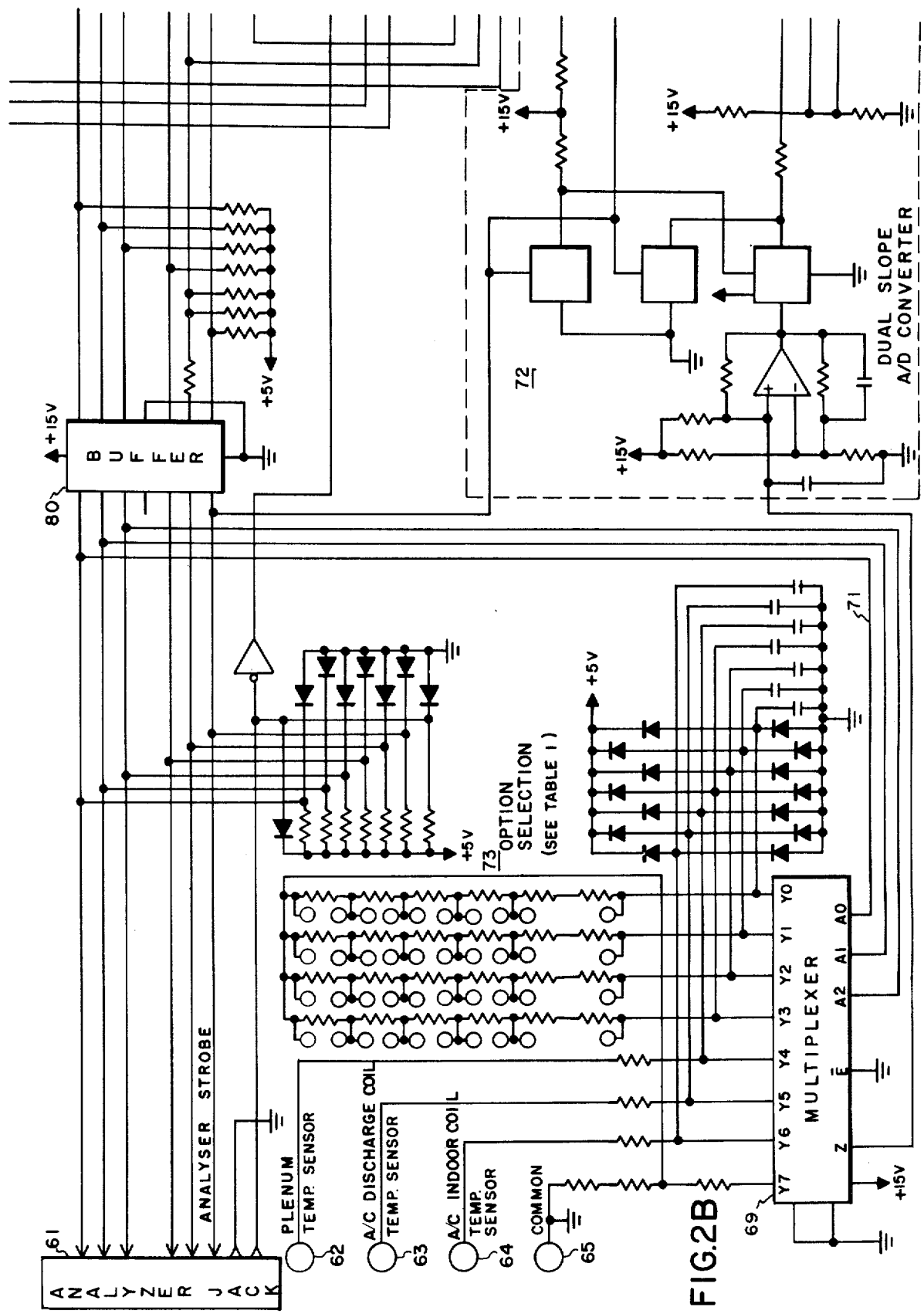
Figure 2C:
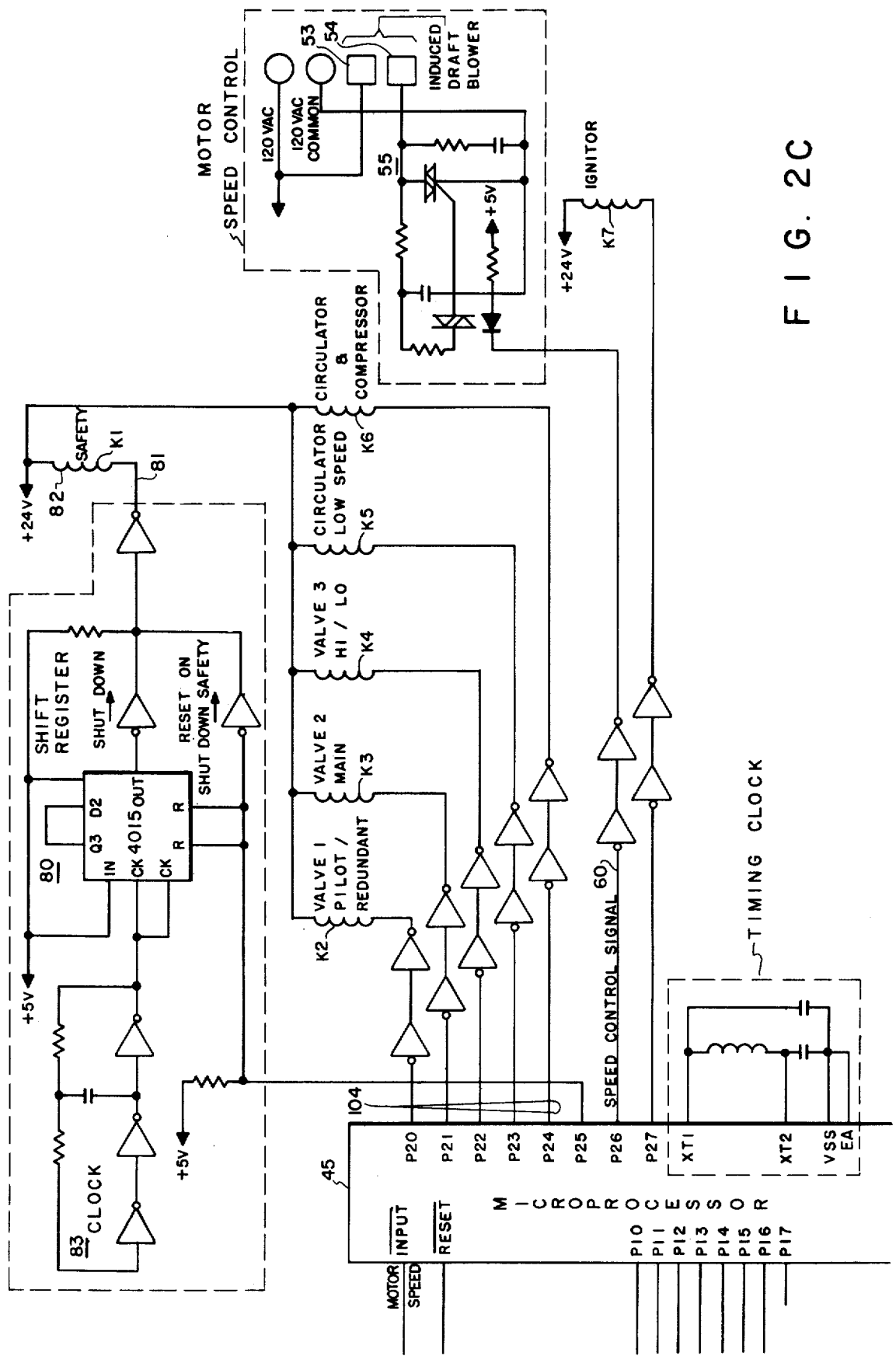
Figure 2D:
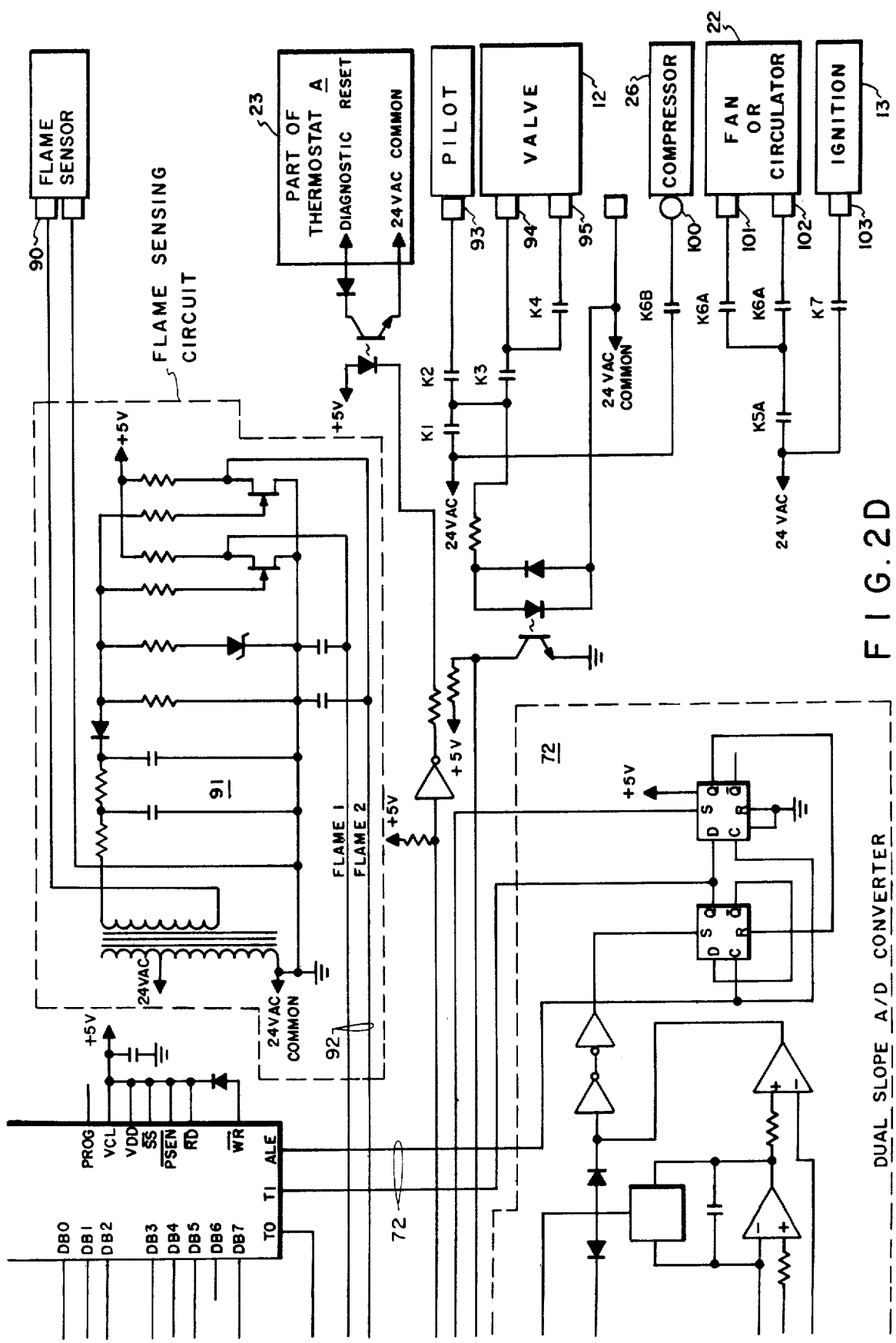

An input is provided at 61 in FIG. 2B for a conventional analyzer which would be connected over a buffer 80 to the microprocessor for analyzing the operation of the system. Input circuit 62 connects plenum temperature responsive element or sensor 20. Input 63 connects a temperature responsive element or sensor 36 which senses the temperature of an air conditioning discharge coil when the refrigeration system is used. Input 64 connects temperature responsive element or sensor 37 from the indoor coil when the air conditioning system is used. Connection 65 is a common connection for many of the input circuits.

These sensors, that is the plenum sensor 20, air conditioning discharge coil temperature sensor 36, air conditioning indoor coil temperature sensor 37, are all connected to a conventional CMOS 4051 multiplexer 69 which provides an output over conductor 71 to a conventional analogue to digital dual slope converter 72 providing the input to terminals T1 and ADE of the microprocessor over conductors 72 in FIG. 2D.

An optional selection circuit 73 is shown on FIG. 2B which provide for different arrangements of the circuit to the multiplexer in accordance with a selection table I as Appendix I. The optional selection can be accomplished by making different circuit connections either by breaking jumpers or using conventional pins to make selected connections.

Referring to FIG. 2C, a shift register 80 has an output at 81 connected to a safety switch relay 82 and K1. Referring to FIG. 2D, input 90 provides the connection from the flame igniter and flame sensor 13 and is connected to the flame sensor circuit 91 of the type S825C made and sold by Honeywell Inc. and shown in brochure 60-2053-8 of July 1980 for providing a redundant signal over conductors 92 to the pins P13 and P15 of the microprocessor. Inputs 93, 94 and 95 are connected to the gas valve 12 and provide for a control of the pilot valve and main valve and high fire valve when two stage burner operation is used. Output 100 is connected to the motor compressor. Output 101 and 102 for low and high speed operation are connected to a circulation fan 22, and output 103 is connected to the igniter 13. The output of the microprocessor from conductors 104 are connected to control a plurality of relays K2, K3, K4, K5 and K6, which have associated contacts with similar labels for controlling the various components connected to output circuits 94, 95, 100, 101, 102 and 103.

DESCRIPTION OF THE OPERATION OF THE PREFERRED EMBODIMENT

Referring to FIG. 1, upon a call for heat by the space thermostat 23, the induced draft blower 15 is energized and after a predetermined delay, gas valve 12 is energized. Hot gases are exhausted from the stack as soon as ignition takes place by the ignition apparatus 13. Temperature sensor 20 responds to the temperature of the air in the plenum.

Sensor 20 operating through control module 24 operates as a high limit control and also as an operating temperature control at various other temperature levels. For example, module 24 receives the output of sensor 20 and when the temperature exceeds the normal operating temperature to reach 160° F., an excessive temperature indication is given by 70 on thermostat 23 of FIG. 1. If the temperature of sensor 20 reaches 180° F., valve 12 is reduced to a low fire stage. If the sensor reaches 200° F., valve 12 is cycled on and off whereby any further increase in the operating temperature results in the gas supply being 100% off. Module 24 using the output of sensor 20 also provides the control of fan 22 to turn the circulation off when the furnace output temperature is below 95° F.

Air is received from the return air duct 16 through the filter 17 by the fan 22 and delivered to the space 21 through a supply duct 18, except in connection with the refrigeration heat exchanger coil 28 which would be used when the refrigeration apparatus were used for heating and/or cooling.

Under normal operation, the plenum temperature or furnace output remains substantially the same as with a predetermined fuel flow through valve 12 and a predetermined air flow into the combustion chamber as determined by the speed of the fan 15 in the exhaust duct. Upon a change in the plenum temperature such as an increase in the temperature during heating, unless other conditions of the system changed which are known to the control module 24, an abnormal condition would be taking place. The increase in the plenum temperature is brought about if the air flow through the plenum were reduced as the transfer of heat from the combustion chamber is reduced. Such an increase in the plenum temperature is indicative of a blocked air duct, a slowing down or stoppage of the circulating fan 22, and/or a blocking of the filter 17 as the filter becomes dirty.

By means of an indication light or diagnostic indicator 70 on the space thermostat which is connected to an output of the microprocessor 24 over conductors 44, when the control module 24 senses a change in the plenum temperature which deviates from the normal temperature and is not caused by a program change in the normal operation of the temperature conditioning apparatus, such an abnormal condition will be indicated by indicator 70. When the abnormal condition such as an increase in temperature of the plenum during the normal operation can be overcome such as by the reduction of the fuel flow to the burner, the control 24 reduces the fuel flow of the gas valve 12 by switching the gas valve from a high stage of operation to a lower stage of operation.

TABLE I

| DESCRIPTION | SELECTABLE OPTIONS | |
|---|---|---|
|  | NUMBER OF CHOICES | REMARKS |
| SAFETY LIMIT | 5 | -185, 200, 215, 230, 245° F. (TO BE FIELD SELECTABLE) DIFFERENTIAL −15° F. ± 5° F. CALIBRATION ACCURACY - ± 8° F. |
| IGNITION TYPE | 2 | DSI OR I.P. |
| FLAME ESTABLISHMENT PERIOD |  |  |
| - DSI. MAIN BURNER | 5 | 4, 6, 11, 21, 60 SEC |
| - I.P. - PILOT | 2 | 15 & 90 SEC |

TABLE I-continued

| DESCRIPTION | SELECTABLE OPTIONS | |
|---|---|---|
| | NUMBER OF CHOICES | REMARKS |
| PRE-PURGE | 2 | 0 & 25 SEC FOR GAS |
| | 3 | (0, 25 & 45 SEC FOR OIL) |
| POST PURGE | 1 | O SEC FOR GAS |
| | 2 | (0 & 20 SEC FOR OIL) |
| VALVE | 2 | SINGLE OR 2 STAGE |
| DRAFT | 2 | INDUCED OR NATURAL |
| | | (INDUCED DRAFT MANDATORY W/2 STAGE) |
| *SYSTEM TYPE | 2 | HIGH OR LOW MASS |
| *TRAILS FOR IGNITION (AUTO RE-CYCLE) | 2 | 3 FOR GAS 1 FOR OIL |

APPENDIX I

The embodiments of the invention in which an exclusive property or right is claimed are defined as follows:

1. In a temperature control system for a temperature changing apparatus delivering temperature conditioned air from a plenum by an air blower to a space comprising space temperature responsive means adapted to respond to the temperature in the space, control means adapted to control the temperature conditioning apparatus, means connecting said space temperature responsive means to said control means to maintain a predetermined temperature in the space, operating output temperature responsive means adapted to respond to the output temperature of the conditioned air, means connecting said operating output temperature responsive means to said control means for detecting an abnormal operation of the temperature conditioning apparatus upon an abnormal increase in the output temperature, wherein said output responsive means upon a first increase to a first predetermined output in operating output, provides a visual indication of said first output, upon a second increase to a second predetermined output in operating output, provides a signal to said control means to reduce the operation of the temperature conditioning apparatus, and upon a third increase to a third predetermined output in operating output, provides a turning off operation.

* * * * *